March 4, 1969     M. W. BANG     3,431,530
GEAR AND RACK POTENTIOMETER ACTUATOR
Filed July 9, 1968     Sheet _2_ of 2

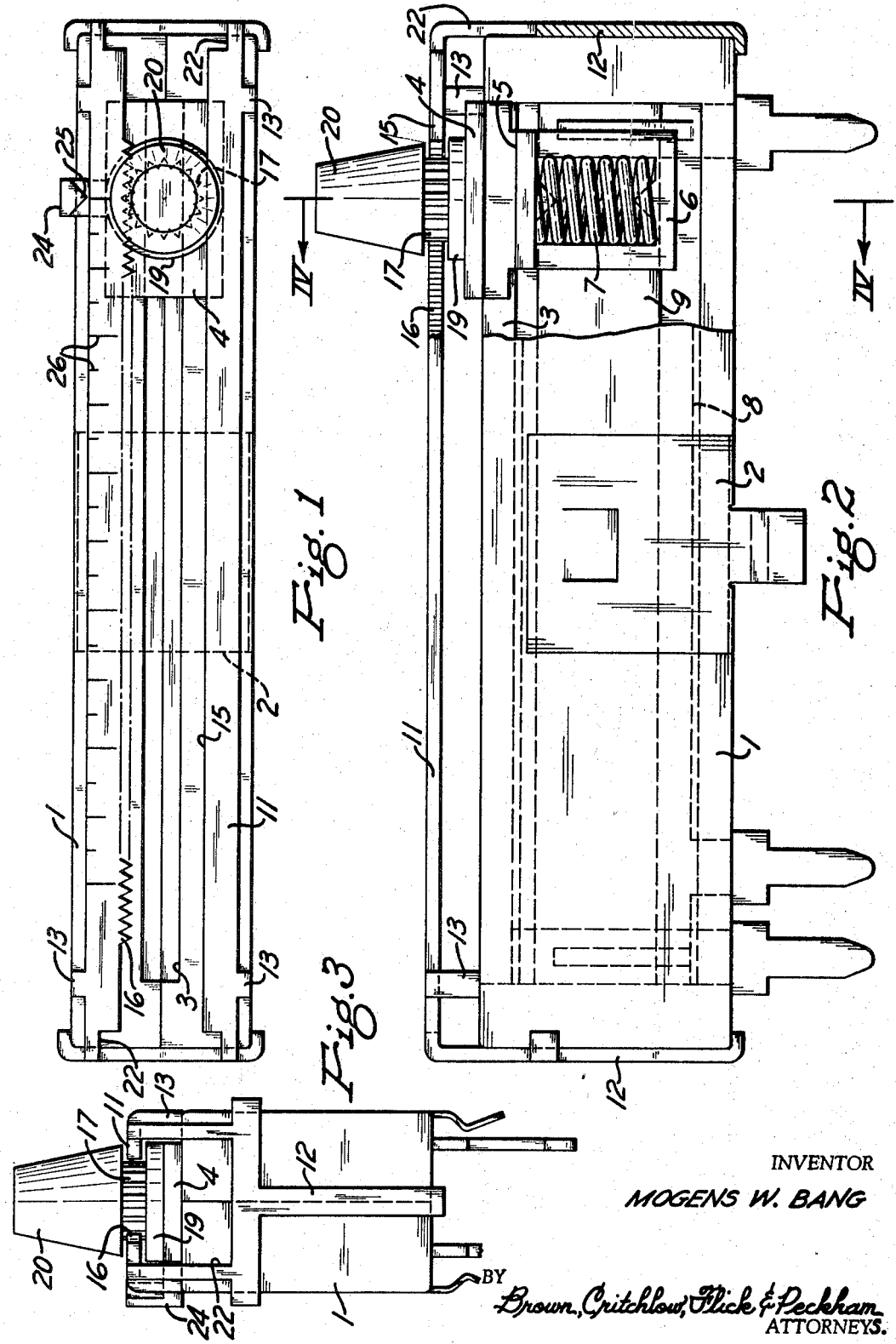

INVENTOR
MOGENS W. BANG

BY
Brown, Critchlow, Flick & Peckham
ATTORNEYS.

United States Patent Office 3,431,530
Patented Mar. 4, 1969

3,431,530
GEAR AND RACK POTENTIOMETER ACTUATOR
Mogens W. Bang, Ridgway, Pa., assignor to Stackpole Carbon Company, St. Marys, Pa., a corporation of Pennsylvania
Filed July 9, 1968, Ser. No. 743,444
U.S. Cl. 338—183                        9 Claims
Int. Cl. H01c 5/02

ABSTRACT OF THE DISCLOSURE

An elongated potentiometer housing has a longitudinal slot in its front, in which is disposed a slide that carries a bridging contact engaging resistance and collector elements inside the housing. A clip is secured to the outside of the housing and provided with a longitudinal slot in front of the housing slot. A side wall of the clip slot is provided with a row of rack teeth, with which registers a gear that is rotatably connected with the slide. There is provision for turning the gear to cause it to travel along the row of rack teeth and thereby move the slide along the housing slot.

---

In my co-pending patent application, Ser. No. 660,652, filed Aug. 15, 1967, a potentiometer is shown in which the slide is movable by turning a gear rotatably mounted on it and meshing with a row of rack teeth extending lengthwise of the housing, with which the rack teeth are integral. Although that potentiometer operates satisfactorily, it requires a special housing because of the rack teeth. Consequently, one form of housing has to be provided where the gear is to be used and another form of housing without the rack teeth when the gear is not wanted. This increases the cost of production.

It is among the objects of this invention to provide a linear motion potentiometer, in which very fine adjustments of the bridging contact along the resistance element can be made very easily in which the housing can be the same whether or not the slide is moved by a gear and rack, and in which a potentiometer without a gear and rack can be quickly converted to gear operation when desired.

The preferred embodiment of the invention is illustrated in the accompanying drawings, in which—

Figure 6:
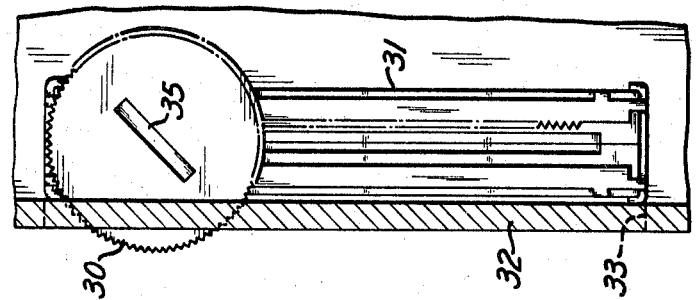
Figure 5:
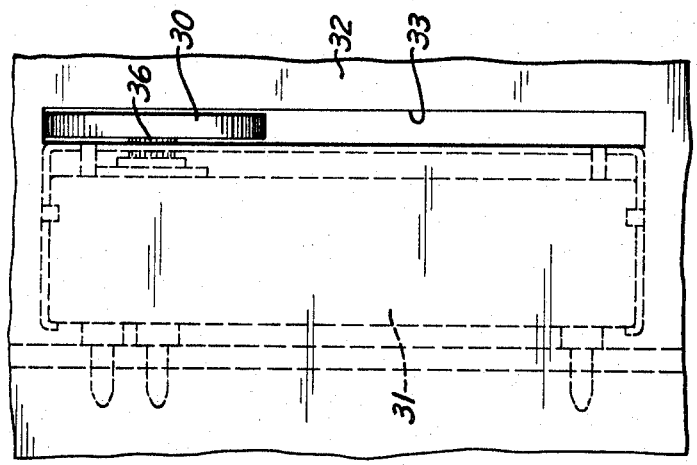
Figure 4:
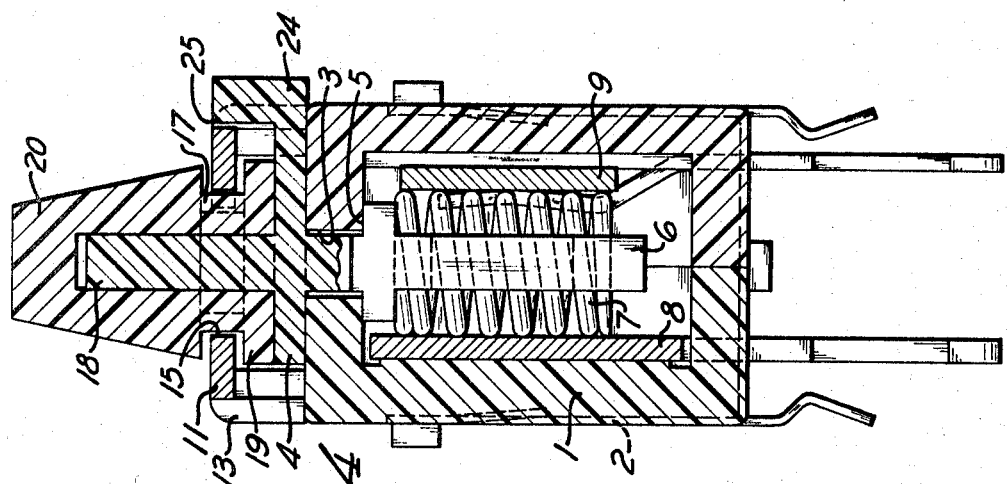

FIG. 1 is a front view of the potentiometer;
FIG. 2 is a side view thereof, with part of the near wall broken away;
FIG. 3 is an end view;
FIG. 4 is an enlarged cross-section taken on the line IV—IV of FIG. 2;
FIG. 5 is a side view of a panel, against which a modified potentiometer is mounted; and
FIG. 6 is a front view of the modification and a section through the panel.

Referring to FIGS. 1 to 4 of the drawings, the long rectangular housing 1 of the potentiometer may be formed from a molded plastic or other suitable rigid material. The housing preferably is made from two molded half sections that have meeting edges extending from front to back across the ends of the housing and lengthwise along its back. The half sections are joined together in any suitable manner, such as by rivets or a spring clamp 2. The front of the housing is provided with a centrally located longitudinal slot 3, in which a slide 4 is slidably mounted. The opposite sides of the slide are provided with grooves 5 (FIG. 4) that receive the front of the housing at the opposite sides of its slot. Extending from the slide toward the back of the housing is a frame 6, in which is mounted a coil spring 7 that serves as a bridging contact engaging a metal collector strip 8 and an electrical resistance strip 9 at opposite sides of the inside of the housing.

It is a feature of this invention that a clip preferably of metal, is attached to the housing. This clip has a front portion 11 overlying the front of the housing, and integral end tongues 12 that extend rearwardly across the ends of the housing and hook over its back. The front portion 11 of the clip is provided with ears 13 bent back against the front of the housing to space portion 11 from it. The clip is preformed and has enough resiliency so that it can be snapped over the housing by sliding the end tongues across the ends of the housing.

The front portion 11 of the clip is provided with a central longitudinal slot 15 in front of the housing slot. A side wall of the clip slot is provided with a row of rack teeth 16 that are engaged by a gear 17 in that slot. This gear is connected to the slide, such as by means of a pin 18 extending through the clip slot as shown in FIG. 4. The pin can be secured to either the gear or the slide and rotatably mounted in the other, but preferably it is secured to the slide and the gear is rotatable on it. To hold the gear on the pin, an annular spacer 19 can be used, which is joined to the inner side of the gear and is of large enough diameter to project laterally into the space between the front of the housing and the front of the clip. The gear may be turned by a knob 20 secured to its outer side. Preferably, the knob and gear and spacer are all formed in one piece, such as from molded plastic.

In order to insert the gear in clip slot 15 when the knob is large enough to overlap the front of the clip at the side of its slot, the ends 22 of that slot extend rearwardly a short distance and are made wide enough to permit spacer 19 to pass through them, as shown in FIGS. 1 and 3. To assemble the gear and clip and housing, the spacer is passed through one of the wide ends of the clip slot before the clip is snapped onto the potentiometer housing. Then the spacer and gear are fitted over slide pin 18 as the end tongues 12 of the clip are slipped across the ends of the housing. When the free ends of those tongues snap into place, the assembly is complete.

The resistance of the potentiometer is adjusted by turning the knob in order to cause the gear to travel along the rack teeth. This movement of the gear moves slide 4 lengthwise of the housing. To aid in correctly positioning the slide, it may have a lateral projection 24 extending out between the housing and the clip, with a pointer 25 on its outer end that will move along the adjoining edge of the clip when the slide is moved. The clip can be provided with longitudinally spaced distance marks or graduations 26 beside the pointer to indicate the position of the slide.

Instead of turning the gear by means of a knob, it may be turned by means of a thumb wheel 30 secured to it in place of the knob. Such a wheel is especially useful when one side of the potentiometer 31 is to be mounted against a panel 32, as shown in FIGS. 5 and 6. The panel can be provided with a slot 33 extending lengthwise of the potentiometer, and the thumb wheel can be made large enough to project through the slot so that it can be turned from the side of the panel opposite the potentiometer.

Another way of turning the gear is to provide wheel 30 with a kerf 35 for receiving a screwdriver. Or, the wheel can be omitted and the kerf formed in the outer face of gear 36 itself.

It will be seen that with this invention a potentiometer housing of conventional form can be quickly converted into one in which the slide is operated by a gear and rack. The advantage of such operation is that it makes it much easier to make fine adjustments of the resistance of the potentiometer.

According to the provisions of the patent statutes, I have explained the principle of my invention and have illustrated and described what I now consider to represent its best embodiment.

I claim:
1. A linear motion potentiometer comprising an elongated housing having a front and back connected by side walls, the front of the housing having a longitudinal slot therein, resistance and collector elements disposed in the housing lengthwise thereof, a slide disposed in said slot and movable lengthwise thereof, a bridging contact inside the housing carried by the slide in sliding engagement with said elements, a clip secured to the outside of the housing and provided with a longitudinal slot in front of the housing slot, a side wall of the clip slot being provided with a row of rack teeth, a gear in the clip slot rotatably connected with the slide and meshing with the rack teeth, and means for turning the gear to cause it to travel along the row of rack teeth and thereby move the slide along said housing slot.

2. A linear motion potentiometer according to claim 1, in which said turning means is a knob secured to the gear.

3. A linear motion potentiometer according to claim 1, in which said turning means is a slot associated with the gear for receiving a screwdriver.

4. A linear motion potentiometer according to claim 1, in which said turning means is a thumb wheel secured to the gear and having a diameter large enough for it to project laterally beyond the side walls of said housing.

5. A linear motion potentiometer according to claim 1, in which said slide is provided with a lateral projection extending out between said housing and clip and having an indicator outer end movable along the clip, and the clip being provided with longitudinally spaced distance marks beside said indicator.

6. A linear motion potentiometer according to claim 1, in which said clip has end portions extending rearwardly across the ends of said housing and hooked over the back of the housing to hold the clip in place.

7. A linear motion potentiometer according to claim 1, including a pin rotatably connecting the gear to the slide, an annular spacer secured to the gear between it and the slide and mounted on said pin, said spacer projecting laterally between the clip and said housing to hold the gear in the clip slot.

8. A linear motion potentiometer according to claim 7, in which said clip slot has an end portion extending rearwardly at an end of said housing, said end portion being wide enough to permit said spacer to pass through it and enter the clip slot.

9. A linear motion potentiometer according to claim 7, in which the front of the clip is provided with rearwardly extending ears engaging the front of the housing to space them apart.

References Cited

UNITED STATES PATENTS

| | | | |
|---|---|---|---|
| 2,091,371 | 8/1937 | McMaster | 338—181 |
| 789,456 | 5/1905 | Rupley | 338—182 |

LEWIS H. MYERS, *Primary Examiner.*

A. T. GRIMLEY, *Assistant Examiner.*

U.S. Cl. X.R.

338—194, 199, 202